March 7, 1967   J. T. ELLIS, JR   3,307,842
SHOCK ABSORBER
Filed Dec. 1, 1964
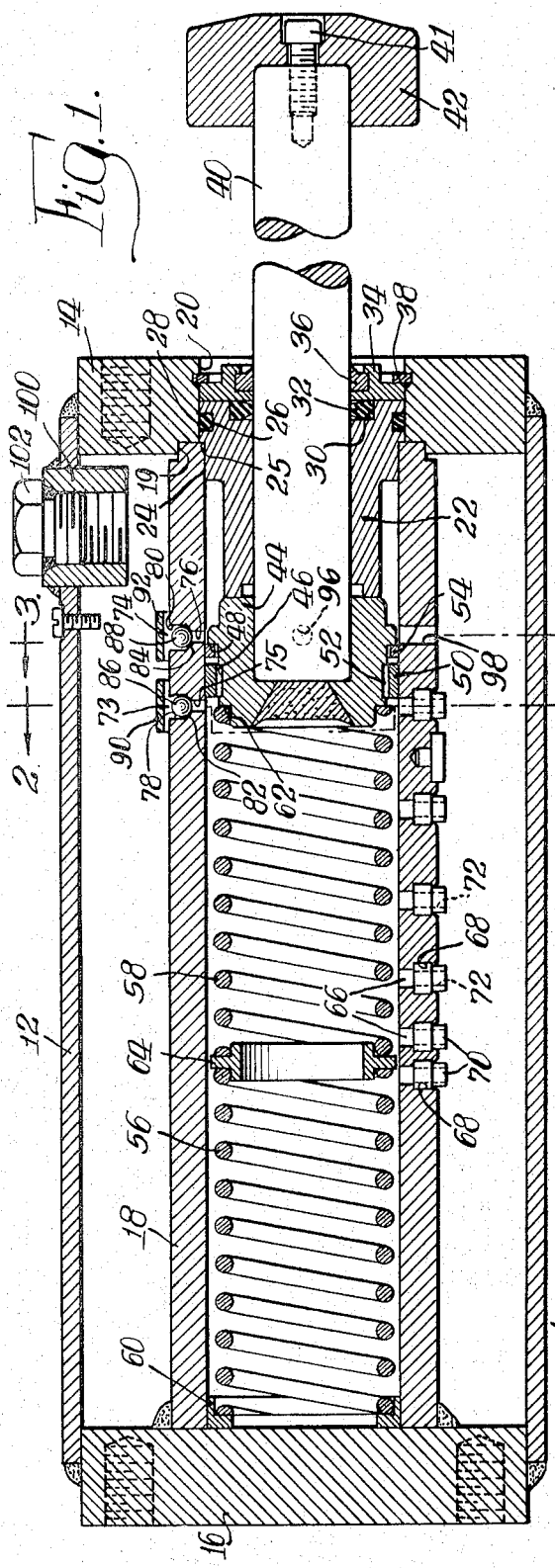
INVENTOR.
John T. Ellis, Jr.,
BY
Atty.

United States Patent Office 3,307,842
Patented Mar. 7, 1967

3,307,842
SHOCK ABSORBER
John T. Ellis, Jr., Chicago, Ill., assignor to Ellis Fluid Dynamics Corporation, Chicago, Ill., a corporation of Illinois
Filed Dec. 1, 1964, Ser. No. 415,110
5 Claims. (Cl. 267—1)

My present invention relates generally to shock absorbers for use, for example, in aircraft, automotive, machine and railroad applications, and more particularly to a hydraulic shock absorber having improved bleed and check means.

One form of hydraulic shock absorber with which the principles of my present invention may be incorporated comprises a housing which is substantially filled with hydraulic fluid, a horizontal pressure tube within the housing, and a piston assembly axially movable within the pressure tube and dividing the latter into a high pressure chamber and a low pressure chamber. The piston assembly has a normal rest position and is connected to a piston rod which extends outwardly of the pressure tube and the housing for receiving impact forces. The pressure tube has bore means in the wall thereof through which hydraulic fluid is metered from the high pressure chamber as the piston assembly is moved away from its normal rest position when impact forces are imposed on the piston rod.

In prior structures, the pressure tube has been provided with a radial port in the upper side of the wall thereof for permitting air that may be trapped in the high pressure chamber to be expelled. However, this bleed port has not operated entirely satisfactorily. Even though oil level within the housing may be one-fourth of an inch or more above the upper surface of the pressure tube, air can be drawn in through such bleed port. This condition is possible because the viscosity of air is less than $\frac{1}{1000}$ of the viscosity of the oil and thus vortices are created in the oil through which the air is drawn down into the pressure tube. In addition, during the pressure stroke of the piston assembly away from its normal rest position, hydraulic fluid is emitted through the bleed port in a jet stream that impinges on the surface boundary between the hydraulic fluid and the air thereabove. Such ejected hydraulic fluid produces foaming and aeration of the hydraulic fluid which then is drawn into the pressure tube and causes a detrimental spongy and regenerative action. Still further, in existing shock absorbers of the type described, a port is normally provided in the wall of the pressure tube for permitting hydraulic fluid to flow outwardly of the low pressure chamber as the piston assembly moves toward its normal rest position. Heretofore, the unrestricted outflow of hydraulic fluid from the low pressure chamber has permitted the piston assembly to impact or hammer against the piston rod support means when rapidly returned to its normal rest position under the force of a return spring.

It is an object of my present invention to provide a hydraulic shock absorber which may be cycled rapidly without foaming and aeration of the hydraulic fluid and without internal hammering.

It is another object of my present invention to provide a hydraulic shock absorber, as described, wherein a port in the form of check valve means is provided in the upper side of the wall of the pressure tube for permitting trapped air to bleed from the high pressure chamber and for preventing air from entering the high pressure chamber.

It is another object of my prevent invention to provide a hydraulic shock absorber, as described, wherein baffle means is arranged in overlying relationship with respect to the port communicating with the high pressure chamber for deflecting hydraulic fluid emitted through the port.

It is a further object of my present invention to provide a hydraulic shock absorber, as described, wherein the pressure tube is provided with a port which communicates with the low pressure chamber when the piston assembly is axially spaced from its normal rest position for permitting hydraulic fluid to flow outwardly of the low pressure chamber as the piston assembly moves toward its normal rest position in engagement with the piston rod support means upon the removal of impact forces from the piston rod, and wherein communication of the described port with the low pressure chamber is interrupted as the piston assembly closely approaches its normal rest position for entrapping hydraulic fluid within the low pressure chamber whereby to cushion engagement of the piston assembly with the piston rod support means.

It is a still further object of my present invention to provide a hydraulic shock absorber, as described, wherein the port in the pressure tube communicating with the low pressure chamber is in the form of check valve means for preventing the ingress of air into the pressure tube, and wherein baffle means is arranged to overlie the check valve means for deflecting hydraulic fluid emitted through the check valve means for the low pressure chamber.

Now in order to acquaint those skilled in the art with the manner of constructing and using hydraulic shock absorbers in accordance with the principles of my present invention, I shall describe in connection with the accompanying drawing a preferred embodiment of my invention.

In the drawing:

FIGURE 1 is a longitudinal median sectional view of a shock absorber incorporating the principles of my present invention;

FIGURE 2 is a transverse sectional view of the shock absorber of FIGURE 1, taken substantially along the line 2—2 in FIGURE 1, looking in the direction indicated by the arrows; and FIGURE 3 is a transverse sectional view of the shock absorber of FIGURE 1, taken substantially along the line 3—3 in FIGURE 1, looking in the direction indicated by the arrows.

Referring now to the drawing, there is indicated generally by the reference numeral 10 a hydraulic shock absorber incorporating the principles of my present invention. The shock absorber 10 includes an outer housing comprised of a tube 12, which may be rectangular in cross section, a front end plate or head 14, and a rear end plate or head 16, all suitably welded in position in a conventional manner. For economy of construction, the outer tube 12 may be formed of two C-shaped channel members welded together along their longitudinal edges. Arranged within the outer housing is a cylindrical pressure tube 18 which, at its forward end, is received in an annular recess 19 formed in the inner face of the front end plate 14 and, at its rearward end, is suitably welded to the inner face of the rear end plate 16.

Mounted within a central axial opening 20 formed in the front end plate 14 is a rearwardly extending piston rod bearing 22. The bearing 22 is of stepped construction with the intermediate cylindrical portion 24 thereof being received in the forward end of the pressure tube 18 and with the annular shoulder portion 25 thereof abutting the forward end of the pressure tube 18 for axially locating the bearing 22. Formed in the outer periphery of that portion of the bearing 22 disposed within the opening 20 is an annular groove 26 in which is disposed an O-ring or seal 28 that provides a fluid seal between the bearing 22 and the front end plate 14. The bearing 22 is also provided, at its forward end, with an annular recess 30 in which is disposed an annular seal 32. Also mounted within the opening 20 in the front end plate 14 adjacent the forward end of the piston rod bearing 22 is a packing retainer 34, which serves to support an annular piston rod wiper 36, and which is maintained in position by means of a split retaining ring 38.

Slidably mounted within the piston rod bearing 22 is a piston rod 40 that projects outwardly of the pressure tube 18 and the shock absorber housing. The seal 32 and the wiper 36 engage the outer periphery of the piston rod 40 and provide a fluid seal during axial sliding movement of the piston rod 40. The outer end of the piston rod 40 has secured thereon, as by a cap screw 41, a bumper cap 42 which serves to protect the end of the piston rod 40 from repeated blows that would otherwise tend to upset the end. The inner end of the piston rod 40 has secured thereon, as by welding, a piston 44. The piston 44, at its outer periphery, is formed with an annular groove 46 and an axially spaced annular shoulder 48. Mounted within the groove 46 is a piston guide bearing 50 the outer periphery of which has sliding engagement with the inner periphery of the pressure tube 18. The guide bearing 50, at its inner periphery, is formed with a plurality of circumferentially spaced transverse slots 52 which each have a depth greater than the depth of the groove 46. Arranged intermediate of the guide bearing 50 and the piston shoulder 48 is a floating piston ring 54. The described piston and piston rod assembly and bearing means therefor are adapted to be inserted within, and withdraw from, the shock absorbing housing, as a unit. Locking of this unit in operative position, and unlocking of the same, is accomplished by simple manipulation of the retaining ring 38.

The piston 44 is normally biased to the rest position shown in FIGURE 1 in engagement with the inner end of the piston rod bearing 22 by means of a pair of coil springs 56 and 58 arranged in series within the pressure tube 18. The rearward end of the spring 56 is received within an annular guide member 60 abutting the inner face of the rear end plate 16, while the forward end of the spring 58 bears against an annular recessed shoulder 62 formed in the rearward end of the piston 44. Interposed between the two springs 56 and 58 is an annular spring guide member 64 which serves to guide the springs during compression and expansion in order to prevent buckling of the springs and resultant scoring of the inner wall of the pressure tube 18.

Formed in the wall of the pressure tube 18 are metering orifice means in the form of a plurality of longitudinally spaced bores 66 and coaxial openings 68. Seated within the openings 68 are bushings 70 having central bores 72 of the same diameter as the bores 66. The peripheral edges of the opening 68 are crimped over onto shoulders of the bushings 70 for securing the latter in the openings 68. The sets of bores 66 and 72, which serve as metering orifices, may be of the same diameter and exponentially spaced apart as shown, or may be of exponentially varying diameter and uniformly spaced apart. This particular form of metering orifice means has been disclosed for purposes of illustration only. It will be appreciated that the principles of my present invention to be described hereinafter may be incorporated with other forms of hydraulic shock absorbers.

The piston 44 divides the pressure tube 18 into a high pressure chamber at the left side of the piston as viewed in FIGURE 1 and a low pressure chamber at the right side of the piston. Formed in the upper side of the wall of the pressure tube 18 are a pair of radial ports 73 and 74 having, respectively, inner sections 75 and 76, outer sections 78 and 80 and intermediate check valve seats 82 and 84. The outer sections 78 and 80 have spherical check valve elements 86 and 88 movable therein and normally resting under the force of gravity on the check valve seats 82 and 84. The check valve elements 86 and 88 are larger in diameter than the diameter of the inner sections 75 and 76 and are slightly smaller in diameter than the diameter of the outer sections 78 and 80. Baffle plates or tabs 90 and 92 are secured at their ends, as by welding, to the outer surface of the pressure tube 18 in overlying relationship with respect to the ports 73 and 74. An an alternative construction, the baffle plates 90 and 92 may be replaced by a single common baffle plate arranged to span both ports 73 and 74. In addition, radial ports 94, 96 and 98 are formed in the sides and bottom of the pressure tube 18. The axes of the ports 74, 94, 96 and 98 lie in a common transverse plane. Also, a sleeve member 100 is secured, as by welding, in an opening formed in the top side of the outer tube 12 and threaded therein is a filler plug 102. Finally, to make the shock absorber of my present invention operational, the shock absorber housing is filled with hydraulic fluid to the level of the lower end of the sleeve member 100. An air space must be maintained within the housing 12 to accommodate displacement of hydraulic fluid whenever the piston rod 40 moves into the pressure tube 18. Hydraulic fluid may be introduced into the housing through the sleeve 100 when the plug 102 has been removed.

The above-described hydraulic shock absorber of my present invention operates as follows. When the piston is substantially in its normal rest position in engagement with the piston rod bearing 22 as shown in FIGURE 1, the inner section 75 of the port 73 communicates with the rearward portion or high pressure chamber of the pressure tube 18 for permitting trapped air to bleed therefrom. Now as impact forces are received by the bumper cap 42, the piston rod 40 and piston 44 are caused to move rearwardly within the pressure tube 18. As rearward movement of the piston 44 commences, pressure initially built up in the hydraulic fluid within the rearward portion or high pressure chamber of the pressure tube 18 causes the floating piston ring 54 to be forced into abutment with the piston shoulder 48 thereby preventing hydraulic fluid from flowing past the piston 44. During rearward movement of the piston 44, the hydraulic fluid within the rearward portion of the pressure tube 18 is forced outwardly thereof through the metering bores 66 and 72. The piston guide bearing 50 immediately interrupts communication between the port 73 and the high pressure chamber as the piston 44 moves away from the piston rod bearing 22 whereby to permit normal metering operation of the bores 66 and 72. As the piston 44 moves past and closes off successively sets of bores 66 and 72, there is a reduction in the number of bores, and hence in the total effective area of the bores, through which hydraulic fluid can be displaced from the tube 18. At the beginning of the stroke of the piston rod 40, the total effective area of the bores available for fluid displacement is at a maximum, while at the end of the stroke when the piston 44 has moved past all of the bores, the total effective area of the bores available for fluid displacement is zero. Because the bores are of a uniform diameter and are spaced apart exponentially, the total effective area decreases exponentially with the stroke of the piston. Therefore, the shock absorber provides a uniform stopping force as well as a uniform rate of deceleration throughout the stroke. However, as indicated above, the principles of my present invention may be incorporated with other forms of hydraulic shock absorber.

When the impact force is removed from the bumper cap 42, the springs 56 and 58 serve to return the piston 44 and piston rod 40 to the position shown in FIGURE 1. During such forward return motion of the piston 44, the floating piston ring 54 moves into abutment with the adjacent side of the piston guide bearing 50 thereby permitting the free flow of hydraulic fluid past the piston 44 through the bearing slots 52. At the same time, hydraulic fluid in the forward portion or low pressure chamber of the pressure tube 18 is permitted to flow outwardly thereof through the ports 74, 94, 96 and 98. As the piston 44 closely approaches its normal rest position in engagement with the piston rod bearing 22, the piston 44 interrupts communication between the ports 74, 94, 96 and 98 for entrapping hydraulic fluid within the low pressure chamber whereby to cushion engagement of the piston 44 with the piston rod bearing 22. Thus hammering between the piston 44 and bearing 22 is prevented even though the piston rod 40 is forced rapidly outwardly, for example, by the return springs 56 and 58.

The check valve elements 86 and 88, which are movable into and out of engagement with the valve seats 82 and 84, permit trapped air and hydraulic fluid to be passed outwardly of the pressure tube 18, and yet prevent the ingress of air into the pressure tube. In addition, the baffle plates 90 and 92 serve to deflect any jet streams of hydraulic fluid emitted through the ports 73 and 74 during strokes of the piston rod 40 whereby to prevent such streams of fluid from impinging on the surface boundary between the hydraulic fluid and the air thereabove so as to eliminate foaming and aeration of the hydraulic fluid. The baffle plates 90 and 92 also serve to retain the spherical check valve elements 86 and 88 within the outer sections 78 and 80 of the ports 73 and 74. The ports 94, 96 and 98, and the metering bores 66 and 72, are located sufficiently below the surface level of the hydraulic fluid to preclude jet action foaming and ingress of air. From the foregoing description, it will be appreciated that I have provided a hydraulic shock absorber that can be cycled rapidly without foaming and aeration of the hydraulic fluid and without internal hammering. Although the hydraulic shock absorber 10 has been shown and described as lying in a horizontal position, it is to be understood that the shock absorber may be mounted in an upright position or in any other angular position.

While I have shown and described what I believe to be a preferred embodiment of my present invention, it will be understood by those skilled in the art that various rearrangements and modifications may be made therein without departing from the spirit and scope of my invention.

I claim:

1. A hydraulic shock absorber comprising a housing adapted to be substantially filled with hydraulic fluid, a horizontal pressure tube within said housing, a piston assembly axially movable within said pressure tube and dividing the latter into a high pressure chamber and a low pressure chamber, said piston assembly having a normal rest position, a piston rod connected to said piston assembly and extending outwardly of said pressure tube and said housing for receiving impact forces, said pressure tube having bore means in the wall thereof through which hydraulic fluid is metered from said high pressure chamber when impact forces are imposed on said piston rod, said pressure tube having first and second radial ports in the upper side of the wall thereof, said first port communicating with said high pressure chamber when said piston assembly is substantially in its normal rest position for permitting trapped air to bleed therefrom, said piston assembly interrupting communication between said first port and said high pressure chamber as said piston assembly moves away from its normal rest position in response to impact forces imposed on said piston rod whereby to permit normal metering operation of said bore means, said second port communicating with said low pressure chamber when said piston assembly is axially spaced from its normal rest position for permitting hydraulic fluid to flow outwardly of said low pressure chamber as said piston assembly moves toward its normal rest position upon the removal of impact forces from said piston rod, said piston assembly interrupting communications between said second port and said low pressure chamber as said piston assembly closely approaches its normal rest position for entrapping hydraulic fluid within said low pressure chamber whereby to cushion said piston assembly, and baffle means overlying said first and second ports for deflecting fluid emitted through said ports.

2. A hydraulic shock absorber comprising a housing adapted to be substantially filled with hydraulic fluid, a pressure tube within said housing, a piston assembly axially movable within said pressure tube and dividing the latter into a high pressure chamber and a low pressure chamber, stop means in said low pressure chamber for locating said piston assembly in a normal rest position a piston rod connected to said piston assembly and extending outwardly of said pressure tube and said housing for receiving impact forces, said pressure tube having bore means in the underside of the wall thereof through which hydraulic fluid is metered from said high pressure chamber when impact forces are imposed on said piston rod, said pressure tube having first and second check valve means in the upper side of the wall thereof, said first check valve means communicating with said high pressure chamber when said piston assembly is substantially in engagement with said stop means for permitting trapped air to bleed therefrom, said piston assembly interrupting communication between said first check valve means and said high pressure chamber as said piston assembly moves away from said stop means in response to impact forces imposed on said piston rod whereby to permit normal metering operation of said bore means, said second check valve means communicating with said low pressure chamber when said piston assembly is axially spaced from said stop means for permitting hydraulic fluid to flow outwardly of said low pressure chamber as said piston assembly moves toward said stop means upon the removal of impact forces from said piston rod, and said piston assembly interrupting communication between said second check valve means and said low pressure chamber as said piston assembly closely approaches said stop means for entrapping hydraulic fluid within said low pressure chamber whereby to cushion engagement of said piston assembly with said stop means.

3. A hydraulic shock absorber comprising a housing adapted to be substantially filled with hydraulic fluid, a pressure tube within said housing, a piston assembly axially movable within said pressure tube and dividing the latter into a high pressure chamber and a low pressure chamber, a piston rod bearing mounted in said housing and said pressure tube at the end of said low pressure chamber, a piston rod connected to said piston assembly and extending outwardly of said pressure tube and said housing through said piston rod bearing for receiving impact forces, said pressure tube having bore means in the underside of the wall thereof through which hydraulic fluid is metered from said high pressure chamber when impact forces are imposed on said piston rod, said pressure tube having a radial port in the upper side of the wall thereof, said port having a check valve seat intermediate of an inner section and an outer section, the outer section of said port having a spherical check valve element movable therein and normally resting on said check valve seat, the inner section of said port communicating with said high pressure chamber when said piston assembly is substantially in engagement with said piston rod bearing for permitting trapped air to bleed therefrom, said piston assembly interrupting communication between said port and said high pressure chamber as said piston assembly moves away from said piston rod bearing in response to impact forces imposed on said piston rod whereby to permit normal metering operation of said bore means, and baffle means overlying said port for deflecting fluid emitted through said port and for retaining said spherical check valve element within the outer section of said port.

4. A hydraulic shock absorber comprising a housing adapted to be substantially filled with hydraulic fluid, a pressure tube within said housing, a piston assembly axially movable within said pressure tube and dividing the latter into a high pressure chamber and a low pressure chamber, a piston rod bearing mounted in said housing and said pressure tube at the end of said low pressure chamber, a piston rod connected to said piston assembly and extending outwardly of said pressure tube and said housing through said piston rod bearing for receiving impact forces, said pressure tube having bore means in the underside of the wall thereof through which hydraulic fluid is metered from said high pressure chamber when impact forces are imposed on said piston rod, said pressure tube having a radial port in the upper side of the wall thereof, said port having a check valve seat intermediate of an inner section and an outer section, the outer section of said port having a spherical check valve element movable therein and normally resting on said check valve seat, the inner section of said port communicating with said low pressure chamber when said piston assembly is axially spaced from said piston rod bearing for permitting hydraulic fluid to flow outwardly of said low pressure chamber as said piston assembly moves toward said piston rod bearing upon the removal of impact forces from said piston rod, said piston assembly interrupting communication between said port and said low pressure chamber as said piston assembly closely approaches said piston rod bearing for entrapping hydraulic fluid within said low pressure chamber whereby to cushion engagement of said piston assembly with said piston rod bearing, and baffle means overlying said port for deflecting fluid emitted through said port and for retaining said spherical check valve element within the outer section of said port.

5. A hydraulic shock absorber comprising a housing adapted to be substantially filled with hydraulic fluid, a pressure tube within said housing, a piston assembly axially movable within said pressure tube and dividing the latter into a high pressure chamber and a low pressure chamber, a piston rod bearing mounted in said housing and said pressure tube at the end of said low pressure chamber, a piston rod connected to said piston assembly and extending outwardly of said pressure tube and said housing through said piston rod bearing for receiving impact forces, said pressure tube having bore means in the underside of the wall thereof through which hydraulic fluid is metered from said high pressure chamber when impact forces are imposed on said piston rod, said pressure tube having first and second radial ports in the upper side of the wall thereof, said first and second ports each having a check valve seat intermediate of an inner section and an outer section, the outer sections of said first and second ports each having a spherical check valve element movable therein and normally resting on said check valve seats, the inner section of said first port communicating with said high pressure chamber when said piston assembly is substantially in engagement with said piston rod bearing for permitting trapped air to bleed therefrom, said piston assembly interrupting communication between said first port and said high pressure chamber as said piston assembly moves away from said piston rod bearing in response to impact forces imposed on said piston rod whereby to permit normal metering operation of said bore means, the inner section of said second port communicating with said low pressure chamber when said piston assembly is axially spaced from said piston rod bearing for permitting hydraulic fluid to flow outwardly of said low pressure chamber as said piston assembly moves toward said piston rod bearing upon the removal of impact forces from said piston rod, said piston assembly interrupting communication between said second port and said low pressure chamber as said piston assembly closely approaches said piston rod bearing for entrapping hydraulic fluid within said low pressure chamber whereby to cushion engagement of said piston assembly with said piston rod bearing, and baffle means overlying said first and second ports for deflecting fluid emitted through said ports and for retaining said spherical check valve elements within the outer sections of said ports.

References Cited by the Examiner
UNITED STATES PATENTS

| | | | |
|---|---|---|---|
| 1,658,962 | 2/1928 | Aikens | 188—88.53 |
| 2,332,161 | 10/1943 | McIntire | 188—88.51 |
| 3,201,110 | 8/1965 | Taccone | 188—96 X |

ARTHUR L. LA POINT, *Primary Examiner.*

MILTON BUCHLER, *Examiner.*

R. M. WOHLFARTH, *Assistant Examiner.*